US012221810B2

(12) United States Patent
Khalife et al.

(10) Patent No.: US 12,221,810 B2
(45) Date of Patent: Feb. 11, 2025

(54) APPARATUS AND METHODS FOR SECURING AN EQUIPMENT CABINET

(71) Applicant: Hoffman Enclosures Inc., Anoka, MN (US)

(72) Inventors: Rony Khalife, Coon Rapids, MN (US); Kevin Roof, St. Louis Park, MN (US)

(73) Assignee: Hoffman Enclosures Inc., Anoka, MN (US)

( * ) Notice: Subject to any disclaimer, the term of this patent is extended or adjusted under 35 U.S.C. 154(b) by 268 days.

(21) Appl. No.: 17/857,355

(22) Filed: Jul. 5, 2022

(65) Prior Publication Data

US 2023/0010900 A1 Jan. 12, 2023

Related U.S. Application Data

(60) Provisional application No. 63/220,065, filed on Jul. 9, 2021.

(51) Int. Cl.
*E05B 57/00* (2006.01)
*E05B 1/00* (2006.01)

(52) U.S. Cl.
CPC ............ *E05B 57/00* (2013.01); *E05B 1/0007* (2013.01)

(58) Field of Classification Search
CPC ...... E05B 57/00; E05B 1/0007; E05B 1/0015; E05B 1/003; E05B 13/004; E05B 13/002; E05B 13/008; E05B 65/0089; E05B 65/52; E05B 65/5253; E05B 63/0052; E05B 13/10; E05B 13/16; E05B 9/08; E05C 3/042; E05C 3/04; E05C 7/02; E05C 7/06; E05C 1/04; H02B 1/38; H02B 1/0003; H02G 3/14; A47B 53/00
(Continued)

(56) References Cited

U.S. PATENT DOCUMENTS 1,544,604 A * 7/1925 Scott ...................... H01H 71/60 200/293
1,907,625 A * 5/1933 Vogt .................... E05B 65/0864 70/DIG. 79

(Continued)

FOREIGN PATENT DOCUMENTS

AU 618824 B2 * 1/1992 ......... E05B 65/0841
AU 2010201451 A1 * 10/2010 ......... E05B 15/0053

(Continued)

*Primary Examiner* — Christine M Mills
*Assistant Examiner* — Steven A Tullia
(74) *Attorney, Agent, or Firm* — Quarles & Brady LLP

(57) ABSTRACT

A securing assembly for locking a first section with a second section of an equipment cabinet against hinging movement. The first section can hingedly support a door of the cabinet. The securing assembly can include a knob, with a pocket, and a latch can be coupled to the knob to be rotated by the knob as the securing assembly is rotated between a free orientation and an engaged orientation. In the free orientation, the latch can be disengaged from the second section to permit the first section to hingedly open away from the second section. In the engaged orientation, the latch can be engaged with the second section to lock the first and second sections together and the pocket of the knob can be receive an arm of a lock on the door to lock the door to the first section and lock the securing assembly in the engaged orientation.

19 Claims, 9 Drawing Sheets

(58) Field of Classification Search
USPC .............................................................. 70/37
See application file for complete search history.

(56) References Cited

U.S. PATENT DOCUMENTS 3,082,617 A * 3/1963 Kerman .............. E05B 65/0864 292/179
3,175,873 A * 3/1965 Blomquist .............. E05C 9/063 292/159
3,735,613 A * 5/1973 Diebel .................... E05B 5/003 200/61.64
3,877,261 A * 4/1975 Robins ................ E05B 65/0864 292/147
4,196,602 A * 4/1980 Akselsen .............. E05B 13/002 70/202
4,470,276 A * 9/1984 Bayless ..................... E05C 7/02 70/91
4,844,565 A * 7/1989 Brafford ................ H02B 1/308 312/111
4,978,152 A 12/1990 Bisbing
4,993,247 A 2/1991 Minemura
5,022,243 A * 6/1991 Embry .................... E05B 5/003 70/34
D320,336 S 10/1991 Johansson
D352,884 S 11/1994 Schlack
D352,887 S 11/1994 Schlack
5,408,853 A * 4/1995 Yamada ................ E05B 13/002 70/210
D362,842 S 10/1995 Levine
5,465,461 A * 11/1995 Sandel ..................... B25G 1/02 16/421
5,568,362 A * 10/1996 Hansson ................ H02B 1/305 439/942
5,598,323 A * 1/1997 Muller ................... H01H 9/226 70/DIG. 30
5,682,775 A * 11/1997 Baber ................... E05C 19/184 70/99
D400,778 S 11/1998 Holbrook, Jr.
5,913,908 A * 6/1999 Czipri ..................... E05C 3/042 70/210
6,038,892 A * 3/2000 Schmitt ................... G06F 1/181 292/303
D444,049 S 6/2001 Decosse
6,305,725 B1 * 10/2001 Antonucci ............ E05B 65/006 292/DIG. 53
D451,780 S 12/2001 Laabs et al.
6,349,576 B2 * 2/2002 Subliskey ........... E05B 65/0841 292/210
6,463,774 B2 10/2002 Sokurenko
6,823,563 B2 * 11/2004 Robinson .............. E05B 35/008 16/443
D537,317 S 2/2007 Jackson, Jr.
7,188,570 B2 * 3/2007 Schluter ................... H05K 7/16 312/200
D546,661 S 7/2007 Jackson, Jr.
D549,075 S 8/2007 Jackson, Jr.
7,276,659 B2 * 10/2007 Thrift ....................... H02B 1/40 174/53
7,360,381 B1 * 4/2008 Leite ....................... E05C 3/042 70/210
7,493,003 B2 * 2/2009 Kowalczyk ........ G02B 6/44526 385/135
7,558,074 B2 * 7/2009 Liang ...................... G06F 1/187 361/728
7,600,794 B2 10/2009 Ramsauer
7,690,083 B2 4/2010 Ramsauer
7,695,031 B2 4/2010 Jackson, Jr. et al.
7,726,750 B2 * 6/2010 Johnson .................... E05C 7/02 312/287
7,726,751 B2 6/2010 Bergmann et al.
7,780,325 B2 8/2010 Collomb et al.
7,882,594 B2 2/2011 Ramsauer
8,001,656 B2 8/2011 Ramsauer
8,347,667 B2 * 1/2013 Bacon ..................... E05B 59/00 292/216
8,559,174 B2 * 10/2013 Cheng ..................... G06F 1/181 174/561
8,667,819 B2 3/2014 Ramsauer
8,814,225 B2 * 8/2014 Yang .................... G11B 33/027 292/57
8,943,653 B2 2/2015 Ramsauer
9,231,390 B2 * 1/2016 Gardiner ................ H02G 3/086
9,425,588 B2 8/2016 Fischer et al.
9,605,455 B2 3/2017 Kamin et al.
9,617,754 B2 4/2017 Ramsauer
9,926,724 B2 3/2018 Kamin
D824,236 S * 7/2018 Chintis .......................... D8/311
D849,502 S 5/2019 Lucic, III
10,481,646 B2 * 11/2019 Wu ......................... G06F 1/181
10,498,119 B2 12/2019 Nehls et al.
10,830,460 B2 * 11/2020 Salunkhe .............. E05B 65/006
10,837,207 B2 * 11/2020 Lorek ....................... E05C 3/12
D903,396 S 12/2020 Lucic, III
D903,397 S 12/2020 Lucic, III
D903,465 S 12/2020 Lucic, III
10,903,637 B2 1/2021 Nehls et al.
D913,027 S 3/2021 Lucic, III
11,432,417 B2 * 8/2022 Hilliard ................... E05C 3/041
11,542,723 B2 * 1/2023 Trammell ............. E05B 35/008
11,862,947 B2 * 1/2024 Düppre .................. H02B 1/308
2008/0002346 A1 * 1/2008 Lin ......................... G06F 1/181 361/735
2008/0040885 A1 * 2/2008 Daoud ................... H04Q 1/025 16/221
2010/0053869 A1 * 3/2010 Sun ......................... G06F 1/184 361/679.6
2010/0238624 A1 * 9/2010 Dai ......................... G06F 1/187 361/679.33
2010/0259141 A1 10/2010 Johnson et al.
2014/0319854 A1 * 10/2014 Lee ....................... E05B 65/006 292/336.3
2022/0371176 A1 * 11/2022 Yang ................... E05B 65/5253
2023/0010900 A1 * 1/2023 Khalife ................... E05B 57/00
2024/0133206 A1 * 4/2024 Papesh ...................... E05C 3/12

FOREIGN PATENT DOCUMENTS

CA 2502404 A1 * 10/2005 ............. E05C 3/041
CN 109413909 B 6/2020
CN 108301683 B * 2/2021 ............... E05B 1/00
DE 202013004326 U1 * 8/2013 ........... A45C 13/126
FR 2967190 B1 * 10/2019 ............. E05B 5/003
GB 2154651 A * 9/1985 ............. E05B 17/22
GB 2187786 A * 9/1987 ............... E05C 7/02
GB 2202266 A * 9/1988 ........... E05B 13/106
GB 2275734 A * 9/1994 ........... E05B 13/002
JP 08151841 A * 6/1996
TW 1817122 B * 10/2023 ........... H05K 7/1489
WO 92/02703 A1 2/1992
WO WO-0065182 A2 * 11/2000 ......... E05B 65/0864
WO 02/35040 A1 5/2002
WO WO-2015184117 A2 * 12/2015 ........... G02B 6/3897
WO WO-2016120578 A1 * 8/2016 ......... E05B 17/2038

* cited by examiner

REFERENCE ART

REFERENCE ART

APPARATUS AND METHODS FOR SECURING AN EQUIPMENT CABINET

CROSS-REFERENCE TO RELATED APPLICATIONS

This application claims priority to U.S. Provisional Application No. 63/220,065, filed Jul. 9, 2021, titled "Apparatus and Methods for Securing an Equipment Cabinet," and is incorporated herein by reference.

BACKGROUND

Equipment cabinets, for example equipment cabinets for housing network ports and cabling, can have sections that are hingedly coupled to allow easy access to the inner portion of the electrical cabinet. It is sometimes preferable to secure the hinged sections of an equipment cabinet together. This can be done to prevent access to the equipment cabinet and/or to prevent accidental opening.

SUMMARY

Some embodiments of the invention can provide a securing assembly for locking together a first section and a second section of an equipment cabinet against hinging movement of the cabinet. The first section can hingedly support a door of the cabinet. The securing assembly can include a knob, with a pocket, and a latch can be coupled to the knob to be rotated by the knob as the securing assembly is rotated between a free orientation and an engaged orientation. The knob can be coupled to and rotatable relative to the first section. With the securing assembly in the free orientation, the latch can be disengaged from the second section to permit the first section to hingedly open away from the second section. With the securing assembly in the engaged orientation, the latch can be engaged with the second section to lock the first and second sections together and the pocket of the knob can be oriented to receive an arm of a lock on the door of the equipment cabinet as the lock is moved from an unlocked orientation to a locked orientation, to lock the door to the first section and lock the securing assembly in the engaged orientation.

Some embodiments of the invention can provide an electrical cabinet including a first section, a second section hingedly coupled to the first section, a door hingedly coupled to the first section opposite the second section, a securing assembly rotatable from a free orientation, in which the first and second sections can be hinged open, to an engaged orientation, in which the securing assembly releasably locks the first section closed with the second section, and a door lock rotatable from an open orientation to a locked orientation, when the securing assembly is in the engaged orientation, to lock the door closed with the door covering the securing assembly. In the locked orientation, the door lock can also lock the securing assembly against rotation from the engaged orientation to the free orientation.

Some embodiments of the invention can provide a securing assembly for locking together a first section and a second section of an equipment cabinet. The equipment cabinet further include a door with a door lock to secure the door relative to the first section. The securing assembly can include a knob that includes a handle configured to be outside of the first section when installed and a body that extends from the handle and is configured to be rotatable inside of the first section when installed. The body can include one or more pockets configured to receive the door lock to secure the knob against rotation and a latch configured to be rotated from a disengaged orientation to an engaged orientation to lock the first and second sections together. The latch can be coupled to the knob so as to rotate with the knob relative to the first and second sections when installed.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
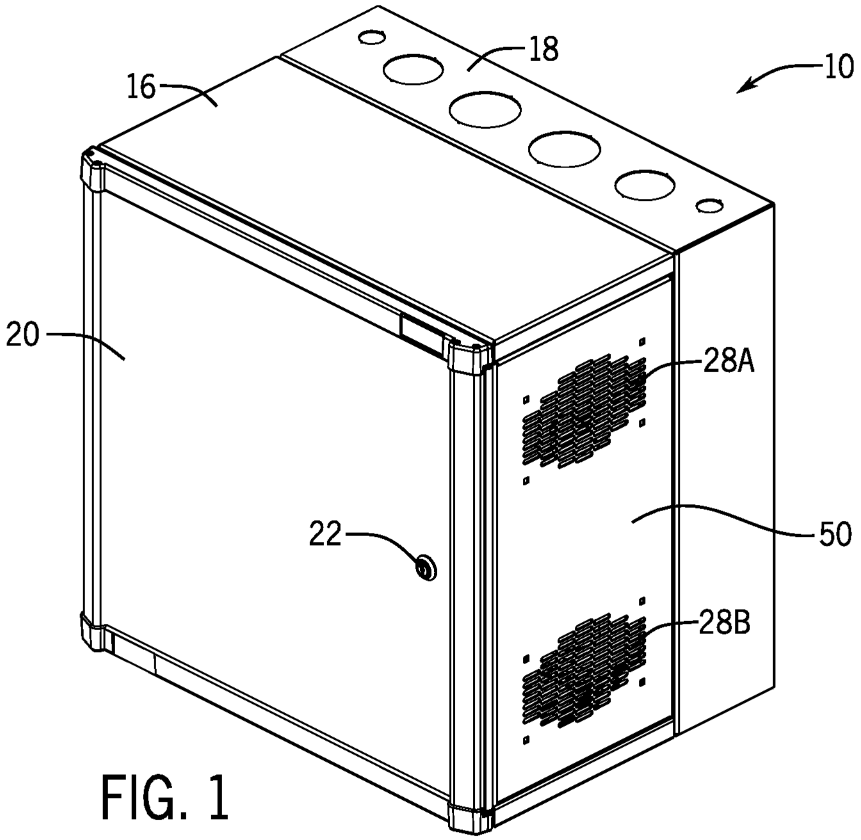
FIG. 1 is a top front right isometric view of an electrical cabinet in which a securing assembly according to an embodiment of the invention is provided.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Unless otherwise specified or limited, the terms "about" and "approximately," as used herein with respect to a reference value, refer to variations from the reference value of ±15% or less (e.g., ±10%, ±5%, etc.), inclusive of the endpoints of the range. Similarly, the term "substantially equal" (and the like) as used herein with respect to a reference value refers to variations from the reference value of less than ±30% (e.g., ±20%, ±10%, ±5%) inclusive. Where specified, "substantially" can indicate in particular a variation in one numerical direction relative to a reference value. For example, "substantially less" than a reference value (and the like) indicates a value that is reduced from the reference value by 30% or more, and "substantially more" than a reference value (and the like) indicates a value that is increased from the reference value by 30% or more.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some of the discussion below describes a securing assembly that can be used to releasably secure sections of an equipment cabinet together. An equipment cabinet can be a cabinet used to store Datacom/Telecom equipment including, for example, routers, splitters, patch panels, etc., and/or cables. Some equipment cabinets have a first/front section and a second/rear section, wherein the first section houses much of the equipment and the second section provides entry and exit points for the cables. The securing assembly can increase the security of the equipment cabinet and reduce the potential for accidental or purposeful tampering with the equipment or cables housed therein. The securing assembly can also simplify joining and separating the first and second sections for those with the authority to do so. The context and particulars of this discussion are presented as examples only. For example, embodiments of the disclosed invention can be used in other contexts, such as for cabinets or other installations having movable sections and can be configured in various ways, including with other shapes and arrangements of elements.

When Datacom/Telecom systems are installed, a cabinet can be installed as a hub, or termination point for multiple network cables. Due to the reliability and security requirements of many such systems, the cabinet is preferably lockable so that the interior is inaccessible to those without the proper authority. Many cabinets come with a lockable front door for added security. However, due to the amount of cabling and equipment housed within a cabinet, having access to the point of entry/exit of the cables and to the back of the equipment housed within the cabinet can be advantageous when it comes to installation or modification of the system. To provide such access, the cabinet can have hinged sections, wherein, for example, one section houses the equipment and another section is the entry/exit point for the cables. To maintain the security of the cabinet, the sections can be releasably secured together. It would be useful to ensure that the assembly used to secure the sections together is easy to operate, does not interfere with any of the cabling or equipment stored within the cabinet, and remains inaccessible when the front door of the cabinet is closed. The potential for unwanted tampering by accessing the cabinet by separating the sections increases if the securing system is accessible when the front door is closed.

Conventional arrangements for securing the connection between relatively movable sections of an equipment cabinet can include multiple engagement systems that can be accessed when the front door of the cabinet is open, but must be accessed by reaching a hand into the cabinet and rotating a handle (see Reference Art discussion below). This can increase the potential for accidentally contacting the equipment and possibly disturbing the electrical connections. Further, there is also potential for the internal handles to be accessed and manipulated through vent slots in the side of the cabinet.

Embodiments of the invention can address these or other issues by providing a secure connection between movable sections of an equipment cabinet. For example, in some embodiments, a securing assembly can include a knob that is accessible external to a front section of the cabinet and the equipment space within the cabinet, but only after the front door of the cabinet is opened. The knob can be coupled to a latch that is engageable with a rear section of the cabinet, which can be disengaged by rotating the knob a quarter turn (e.g., generally, according to a wide variety of known quarter-turn latch mechanisms) or by other degree of rotation (e.g., generally also according to a wide variety of other rotatable latch mechanisms). Further, the securing assembly may be locked in an engaged orientation with a lock on the front door used to also lock the front door. Therefore, even if the securing system is accessed via vents in the side of the cabinet, the securing assembly would be unable to rotate and disengage the front section from the rear section because it is also engaged with the lock on the front door.

In some embodiments, the knob of the securing assembly can include retaining tabs that, once the knob is installed on the cabinet, prevent the knob from being removed from the cabinet. In some cases, the knob must be oriented in an installation orientation to be installed within or removed from the cabinet, but after installation, the latch prevents the knob from returning to the installation orientation. For example, a set of pegs on the latch can be configured to follow a respective set of slots in a section of the front panel adjacent the second section, and the set of pegs can prevent rotation beyond a predetermined angular distance.

Figure 2:
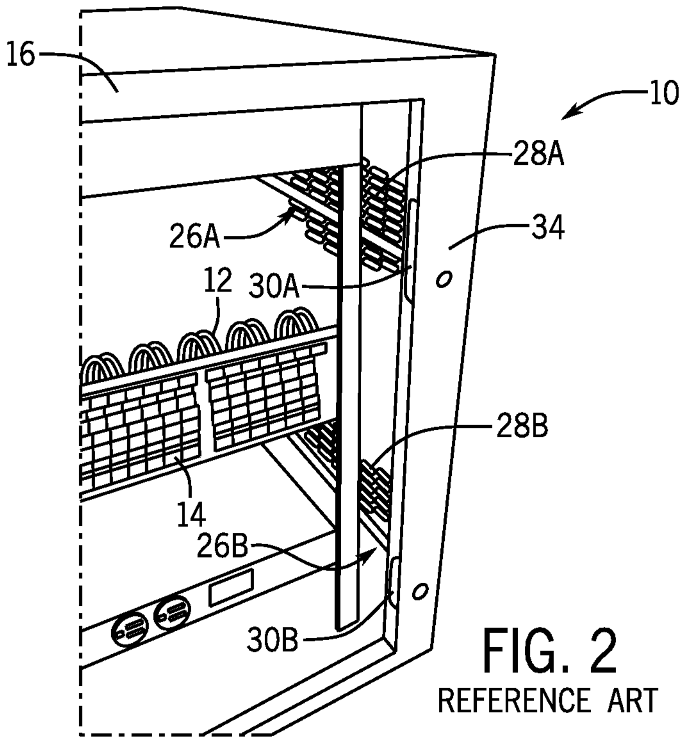
FIG. 2 is a partial top front left isometric view of the electrical cabinet of FIG. 1 with engagement assemblies according to a conventional system.
Figure 3:
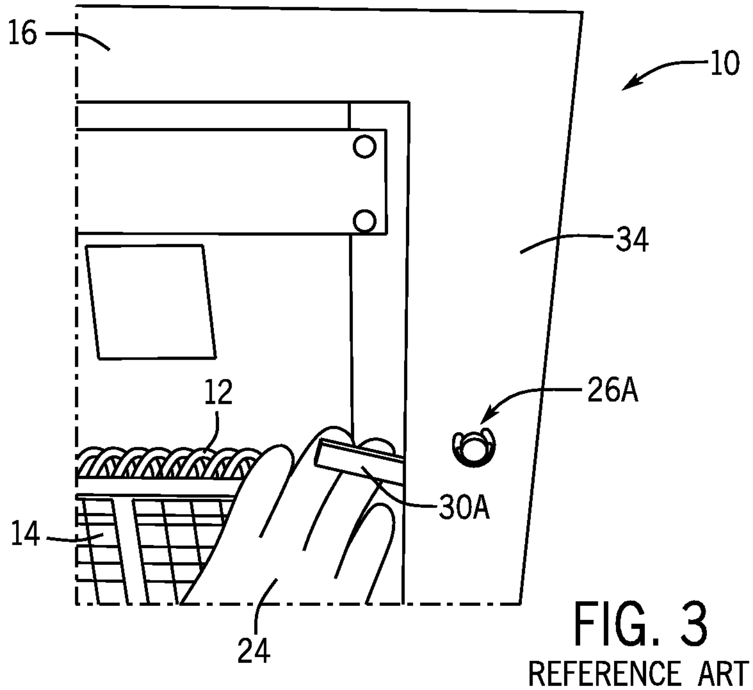
FIG. 3 is a partial top front right isometric view of an engagement assembly of the system of FIG. 2.

FIG. 1 illustrates an electrical cabinet 10 for housing electrical components, for example, network cables 12 and ports 14 (shown in FIGS. 2 and 3). The electrical cabinet 10 has a first section 16 that is hingedly attached to a second section 18 and has a front door 20 that can be locked to the first section 16 with a lock 22. Typically, the first and second sections 16, 18 are separable to allow ease of access during installation or servicing of the electrical components 12, 14. A operator 24 (shown in FIG. 3) can access the first section 16 of the electrical cabinet 10 by unlocking the front door 20 after disengaging the lock 22 from the first section 16, thereby permitting the operator 24 access to the first section 16. However, access to the second section 18 remains limited. The second section 18 can be where many of the network cables enter and exit the electrical cabinet and also where the mounting fasteners (not shown) for fastening the electrical cabinet 10 to a structure are located. Therefore, it can be advantageous to have easy access to the second section 18, for example, from the front of the electrical cabinet 10.

In some conventional electrical cabinets (shown in FIGS. 2 and 3), first and second sections can be releasably engaged to each other with a set of engagement assemblies 26A, 26B accessible from the front section 16. The set of engagement assemblies 26A, 26B are located in the top third and the bottom third of the first section 16 of the electrical cabinet 10 and extend from the front of the first section 16, alongside a set of vents 28 (for example, as shown, a first vent 28A and a second vent 28B) spaced vertically within side walls 50 of the first section 16, and through the back of the first section 16 where they can engage the second section 18. The engagement assemblies 26A, 26B can have handles 30A, 30B that are rotatable to release the engagement between the first and second sections 16, 18. The handles 30A, 30B are located within the first section 16, requiring a operator 24 to reach within the first section 16 to grab and rotate the handles 30A, 30B downward in front of the electrical components 12, 14 to disengage the first section 16 from the second section 18.

Figure 4:
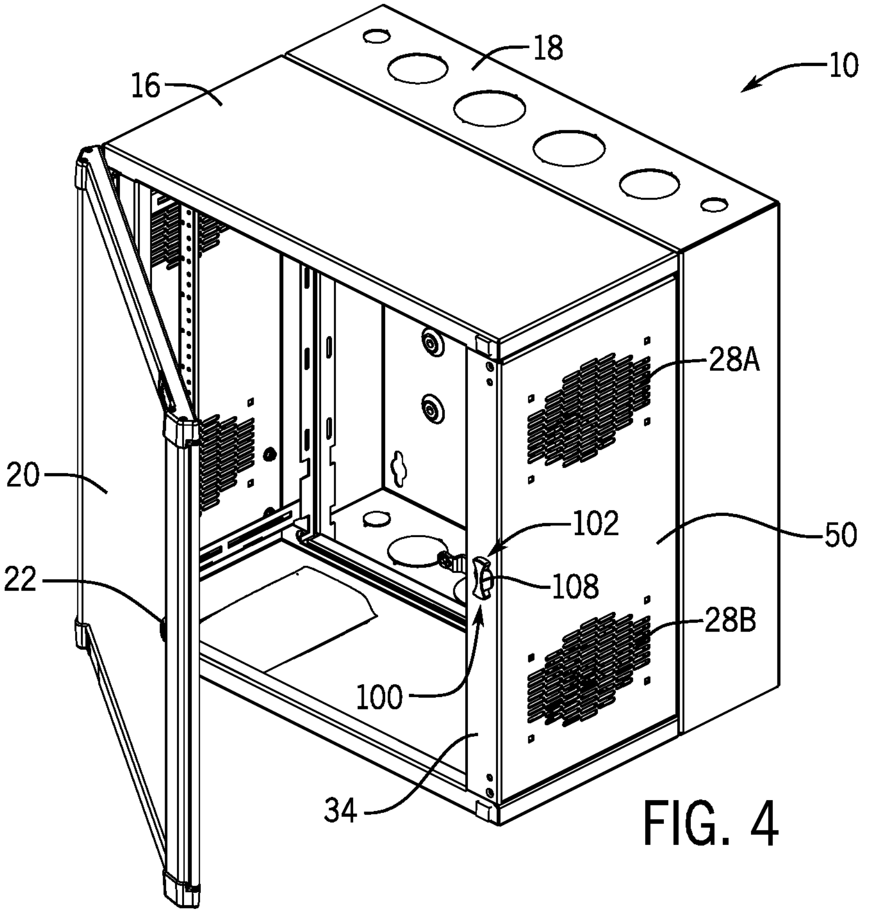
FIG. 4 is top front right isometric view of the electrical cabinet of FIG. 1 with a front door opened exposing a knob of the securing assembly according to an embodiment of the invention.
Figure 5:
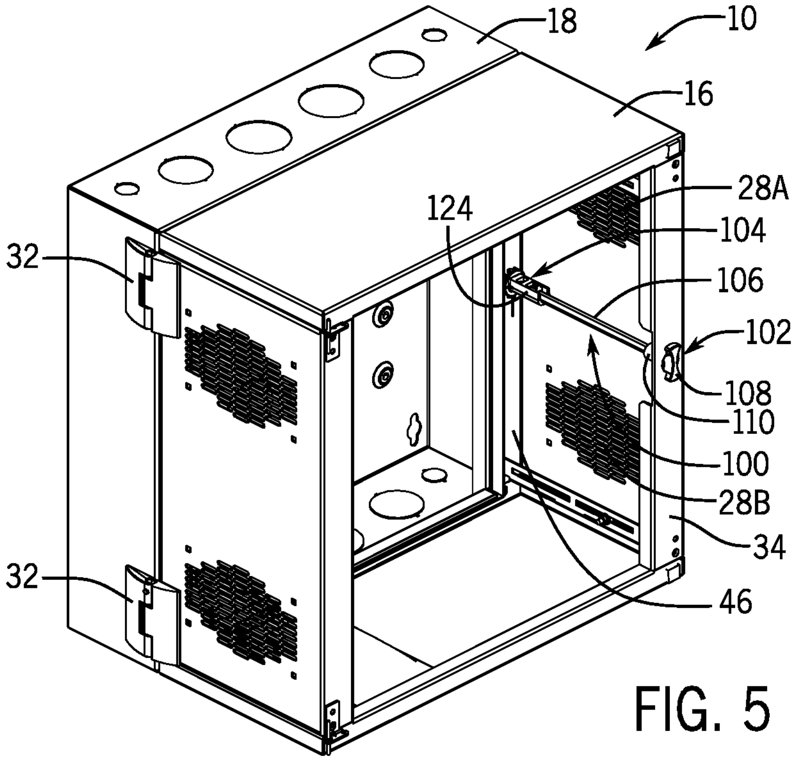
FIG. 5 is a top front left isometric view of the electrical cabinet of FIG. 1 with the door removed.
Figure 6:
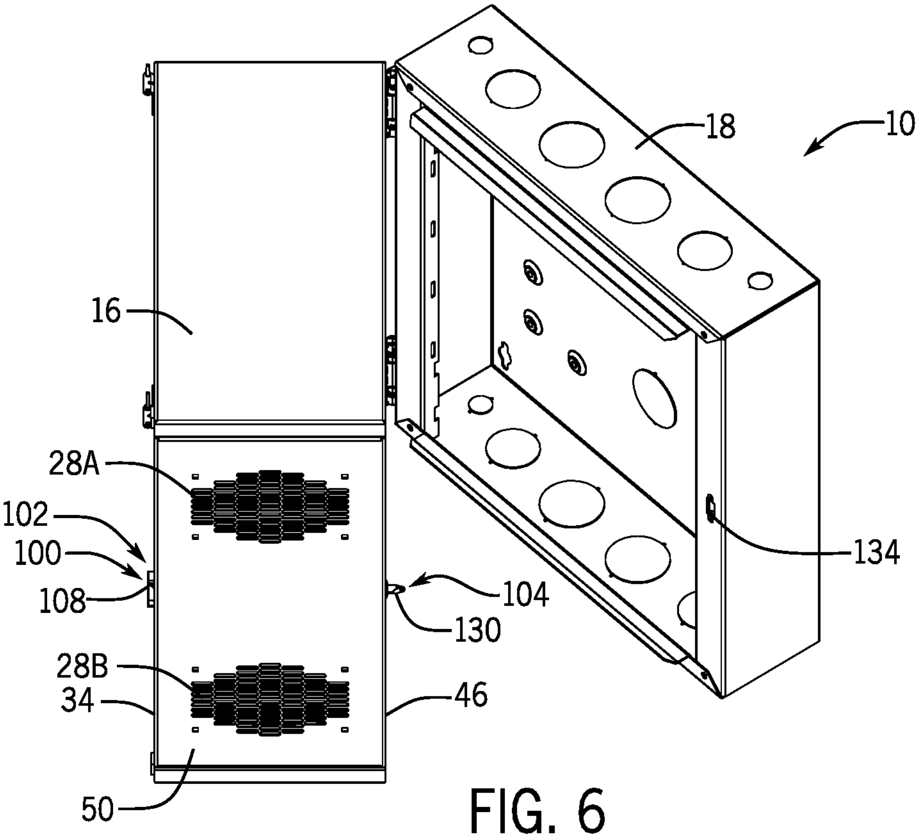
FIG. 6 is a top front right side isometric view of the electrical cabinet of FIG. 1 with a first section shown disengaged from a second section.
Figure 7:
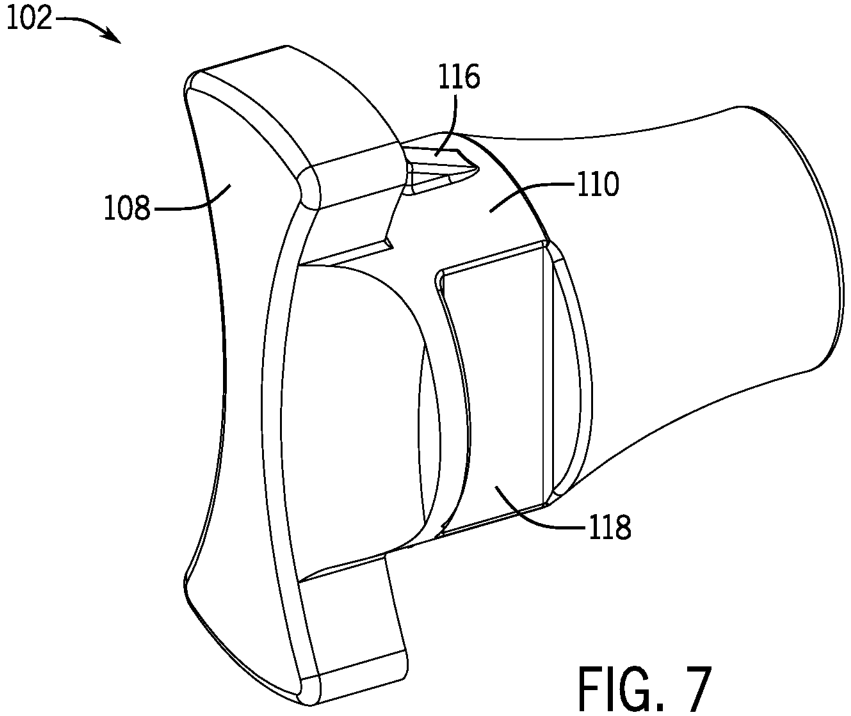
FIG. 7 is a top front right isometric view of a knob from the securing assembly according to an embodiment of the invention.

FIGS. 4 through 6 show the electrical cabinet 10 with a securing assembly 100 according to an embodiment of the invention. FIG. 4 shows the electrical cabinet 10 with the front door 20 open and the first and second sections 16, 18 secured together by the securing assembly 100 in an engaged orientation (see also FIG. 13). FIG. 5 illustrates the electrical cabinet 10 with the front door 20 removed to provide a better view of the securing assembly 100 within the first section 16 in the engaged orientation. As shown in FIG. 5, the securing assembly 100 includes a knob 102, a latch 104, and a connecting rod 106 extending between the knob 102 and the latch 104. The securing assembly 100 is positioned between the cabinet vents 28 (i.e., the connecting rod 106 does not obstruct any part of the cabinet vents 28). FIG. 6 shows the first section 16 released from the second section 18 and rotated therefrom about hinges 32 with the securing assembly 100 in a disengaged, or free, orientation (see also FIG. 12).

Looking to FIGS. 7 through 10, the knob 102 of the securing assembly 100 is shown in various views in isolation. The knob 102 has a handle 108 and a shaft 110 extending from the handle 108 along a shaft axis 112 (shown in FIGS. 9 and 10). In some embodiments, as shown here, the handle 108 and the shaft 110 can be integrally formed. However, in some embodiments the handle 108 and the shaft 110 can be distinct pieces coupled together, for example, with a fastener (not shown). The shaft 110 has a shaft diameter 114 (shown in FIGS. 9 and 10), a set of retaining tabs 116 extending outwardly and oppositely from a periphery of the shaft 110, and at least one pocket (here shown as a set of pockets 118) extending inwardly and oppositely from the periphery of the shaft 110 in a direction perpendicular from the shaft axis 112. In some embodiments, the pockets 118 are spaced equidistantly between the set of retaining tabs 116.

Figure 12:
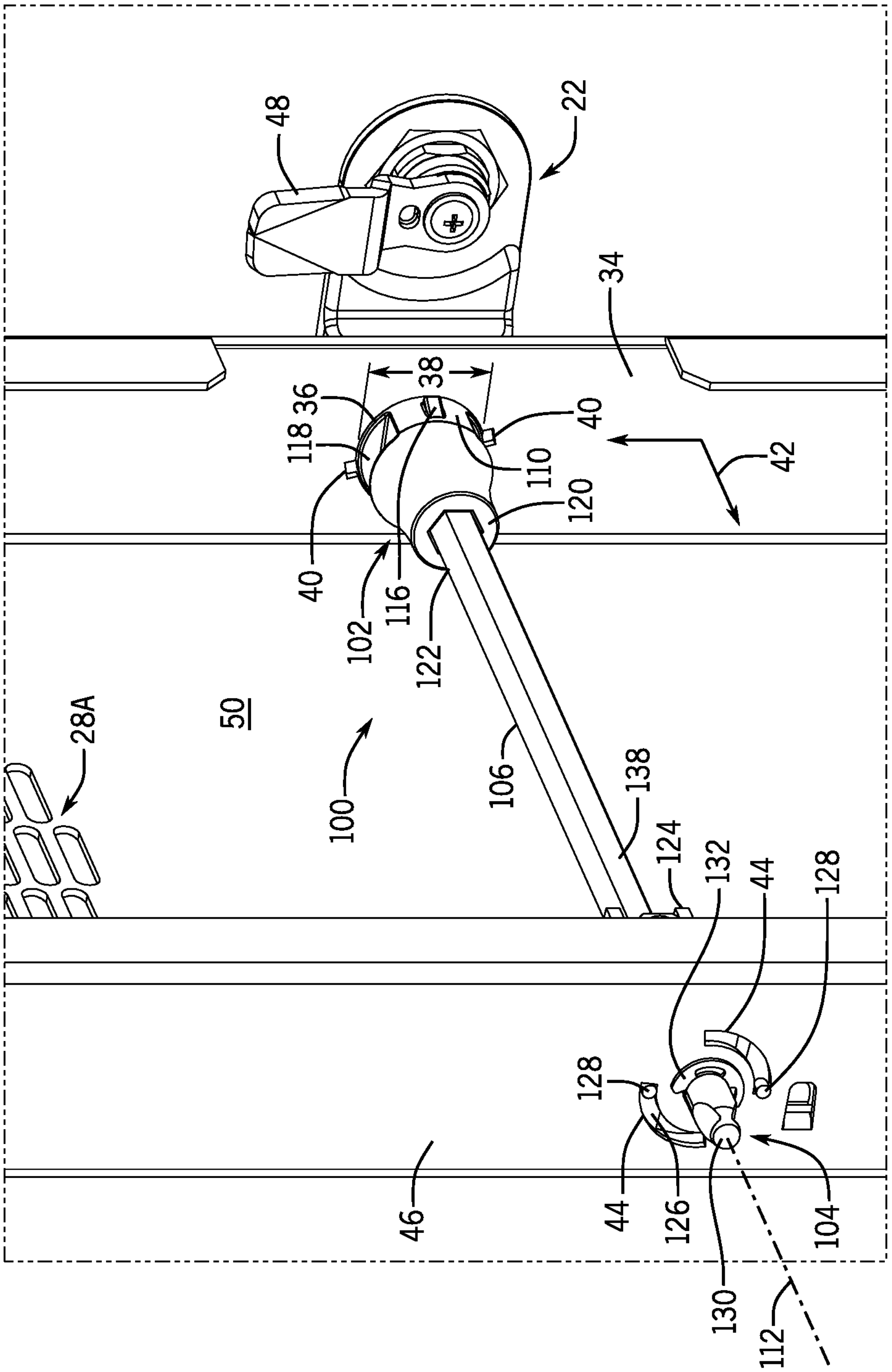
FIG. 12 is a top rear left isometric view of the securing assembly of FIG. 11 in the first section of the electrical cabinet of FIG. 1 according to an embodiment of the invention in a disengaged orientation.
Figure 13:
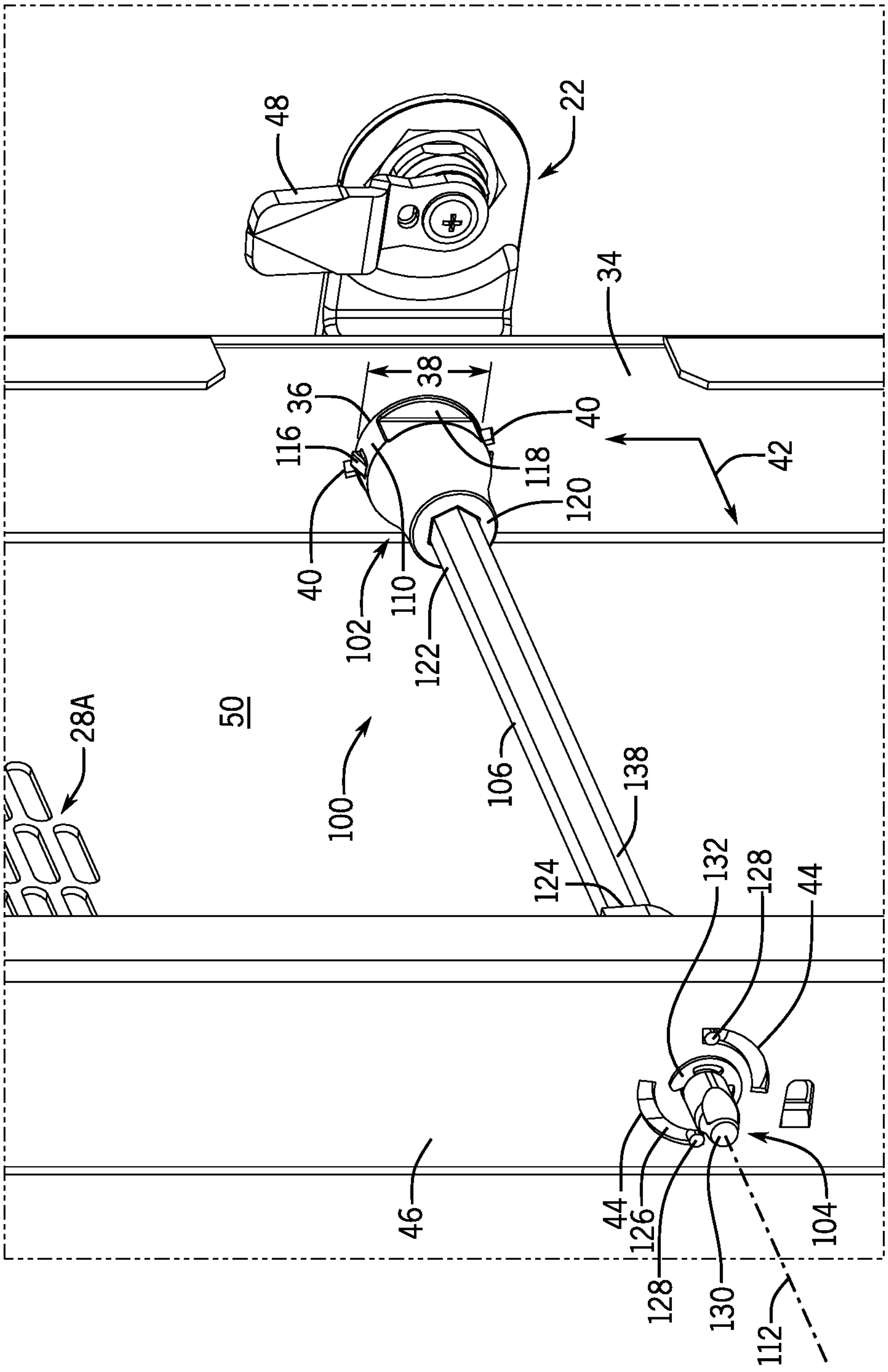
FIG. 13 is a top rear left isometric view of the securing assembly of FIG. 11 in the first section of the electrical cabinet of FIG. 1 in an engaged orientation.
Figure 14:
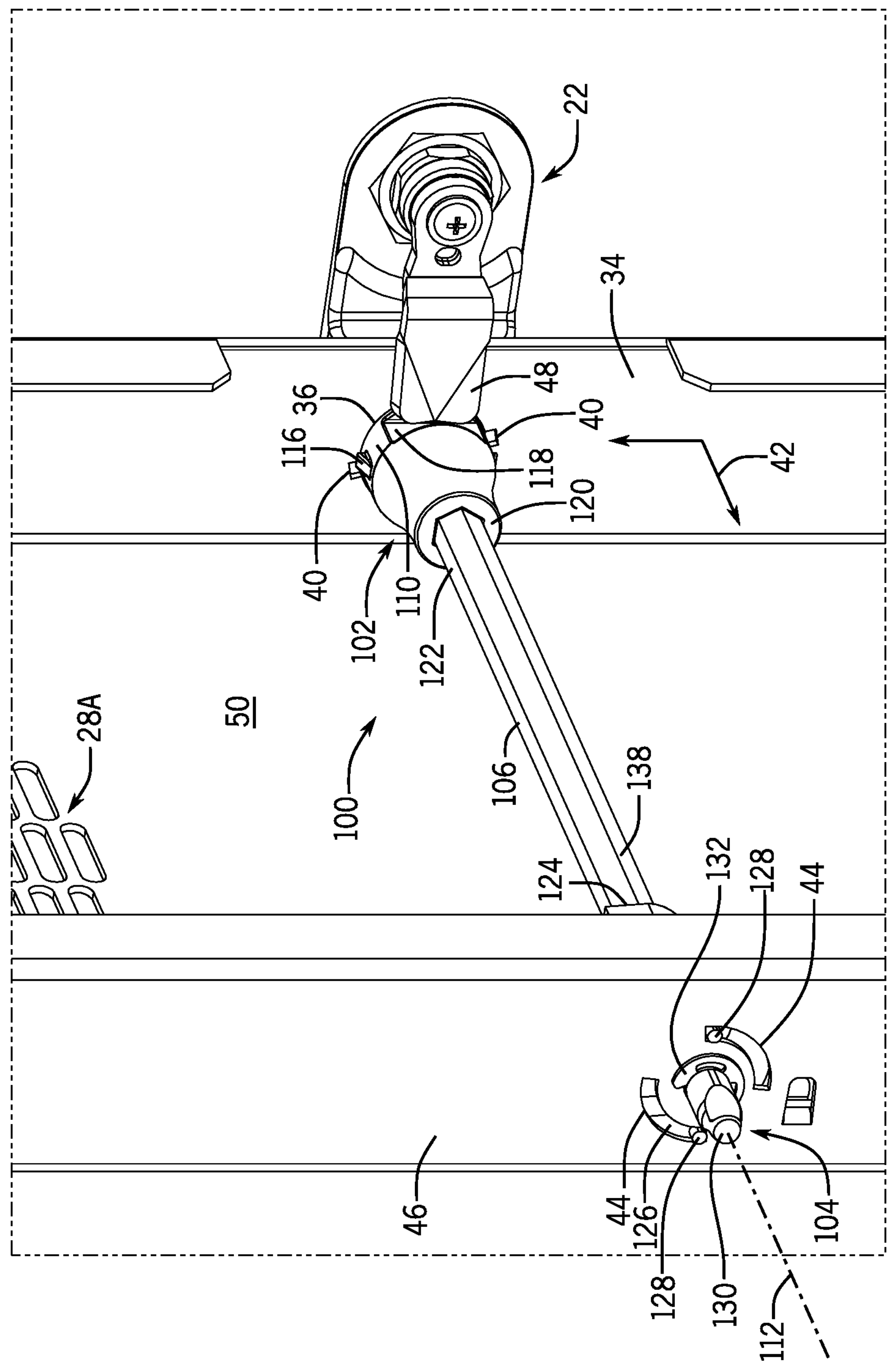
FIG. 14 is top rear left isometric view of the securing assembly of FIG. 11 in the first section of the electrical cabinet of FIG. 1 in an engaged orientation and locked in position by a lock on the front door of the electrical cabinet.

With reference to FIGS. 12 through 14, the knob 102 is configured to be received within a hole 36 within a first, front, panel 34 of the first section 16 of the electrical cabinet 10 in an installation orientation (not shown). The hole 36 is circular, with a hole diameter 38, and has a set of key slots 40. The set of key slots 40 extend outwardly from a periphery of the hole 36 and, in the illustrated example, include a pair of key slots oppositely disposed from each other. The set of key slots 40 are angularly offset from a vertical reference plane 42 extending vertically through the hole 36 from the bottom of the electrical cabinet 10 to the top of the electrical cabinet 10. The angular offset can be in the range of about 5 degrees to about 10 degrees. Or, as can be described with respect to the orientation of the hole 36 and the key slots 40 as shown in in FIG. 12, the key slots 40 can be located between about an 11 o'clock orientation and a 12 o'clock orientation and between about a 5 o'clock orientation and a 6 o'clock orientation on the hole 36.

Once installed, the knob handle 108 of the knob 102 is positioned and accessible from outside the first section 16 and the knob shaft 110 is positioned within the first section 16. The shaft diameter 114 of the knob shaft 110 is sized to be smaller than the hole diameter 38 so that during the installation of the knob 102 within the hole 36, the knob shaft 110 can be received at least partially through the hole 36, and the retaining tabs 116 are configured to be alignable with and receivable through the set of key slots 40. As shown in FIG. 13 in particular, once received within the hole 36, the knob 102 is rotated to position the retaining tabs 116 in alignment with the vertical reference plane 42 and thereby place the knob 102 in an engagement orientation. The retaining tabs 116 each include an abutment surface 136 (shown in FIGS. 9 and 10) configured to abut the inside of the first section 16 of the electrical cabinet 10 when the securing assembly 100 is moved (e.g., pulled) toward the first section 16. The retaining tabs 116 prevent the knob 102 from being pulled back through the hole 36 when the knob 102 is in ether the engagement orientation (shown in FIG. 13) or the free orientation (shown in FIG. 12).

Figure 8:
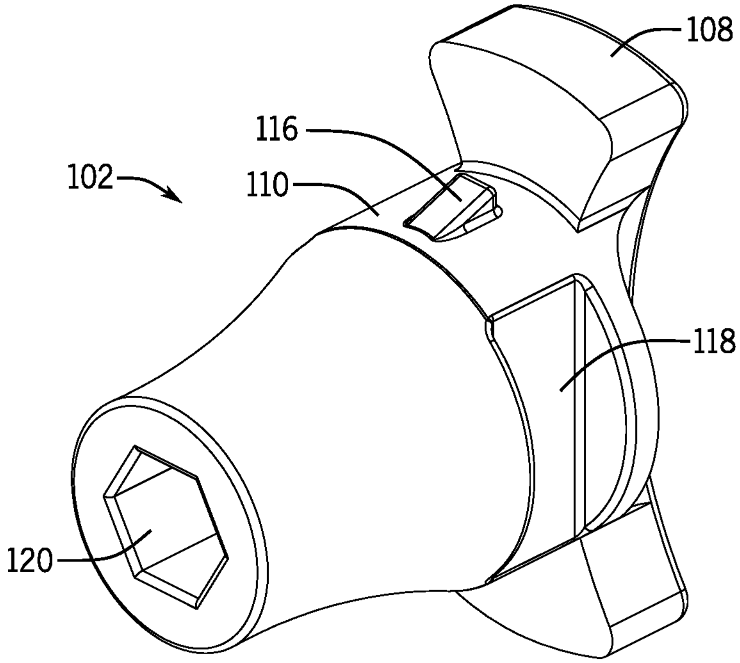
FIG. 8 is a top rear left isometric view of the knob of FIG. 7.
Figure 9:
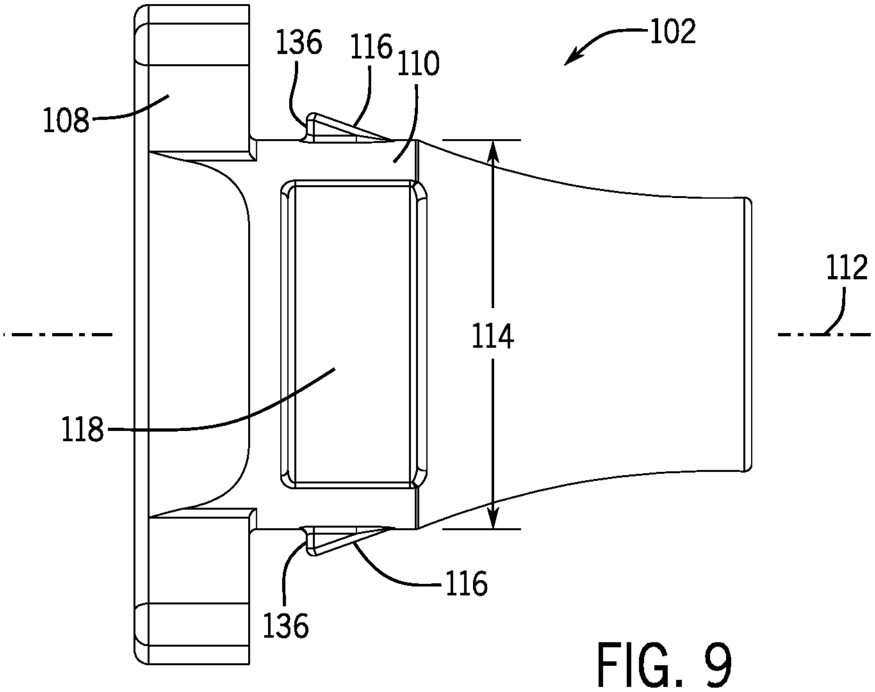
FIG. 9 is a right side elevation view of the knob of FIG. 7.
Figure 10:
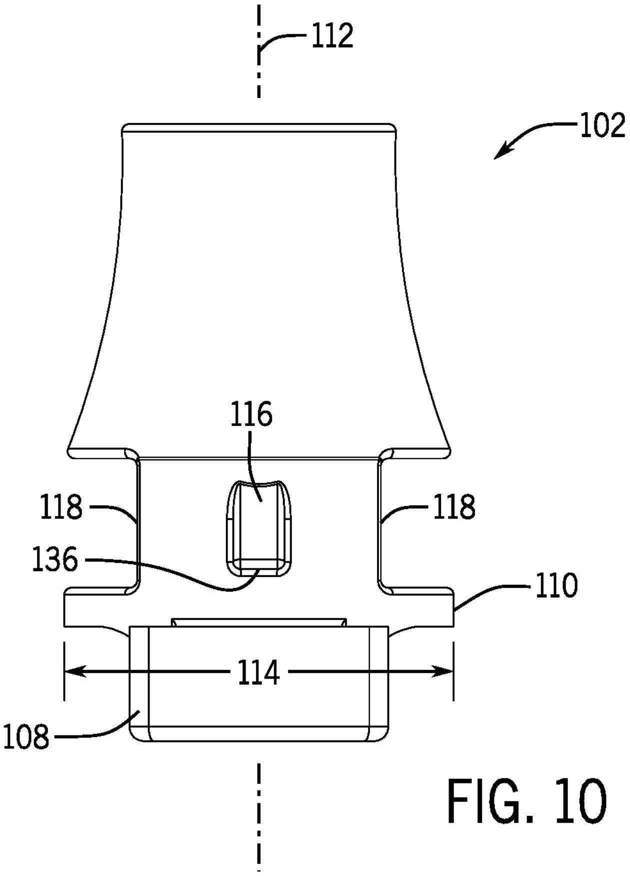
FIG. 10 is a top plan view of the knob of FIG. 7.
Figure 11:
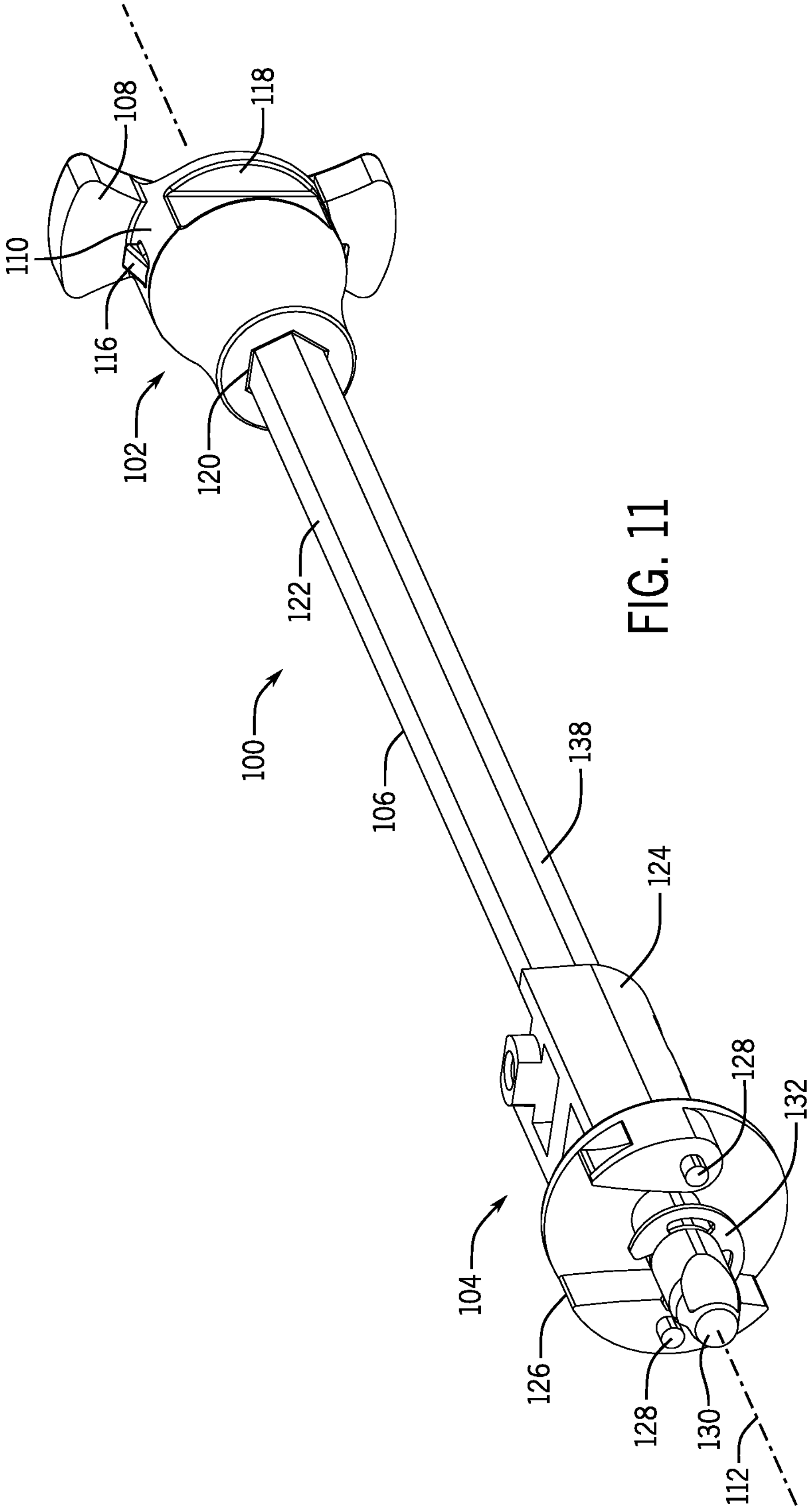
FIG. 11 is a top rear left isometric view of the securing assembly according to an embodiment of the invention.

The knob 106 also includes a chamber 120 as shown in FIG. 8 in particular. The chamber 120 extends inward from an end of the knob 106 distal to the knob handle 108 and along the shaft axis 112. The chamber 120 is configured to receive a first end 122 of the connecting rod 106 (shown in FIG. 11). A second end 138 of the connecting rod 106 is received within a coupling 124 of the latch 104 (shown in FIG. 11), which can include a set screw (not shown) to secure the connecting rod 106 within the chamber 120 at a predetermined depth. Thereby, the knob 102 is operatively connected to the latch 104, and rotation of the knob 102 is directly translated to the latch 104 via the connecting rod 106.

The latch 104 can be seen in FIGS. 5 and 11 through 14. In addition to the coupling 124 described above, the latch 104 has a collar 126 with a set of pegs 128 and a barb 130 extending in a direction away from the coupling 124. The pegs 128 are angularly spaced 180 degrees from each other and are configured to be received within a set of slots 44, respectively, in a second, rear, panel 46 of the first section 16 of the electrical cabinet 10. The set of slots 44 are configured to provide an angular pathway along which the set of pegs 128 can travel to and between a disengaged (or free) orientation of the securing assembly 100 (shown in FIG. 12) and an engaged orientation (shown in FIG. 13), as further discussed below. The securing assembly 100 is therefore retained between the first and second panels 34, 46 of the first section 16 of the electrical cabinet 10, with the set of retaining tabs 116 limiting movement in the direction of the first panel 34 and the collar 126 limiting movement in direction of the second panel 46.

Further, the barb 130 extends from the collar 130 in the same direction as the set of pegs 128 and is configured to extend through the second panel 46. When the securing assembly 100 is assembled, the barb 130 is configured to extend coaxially with the shaft axis 112. The barb 130 is also configured to be removably engageable with a retainer 134 in the second section 18 of the electrical cabinet 10 (see FIG. 6), whereby engagement and disengagement of the barb 130 and the retainer 134 are dependent on the rotational orientation of the knob 102, as further discussed below.

Additionally or alternatively, in some embodiments, as shown here, a snap ring 132 can be attached to the barb 130 proximal to the collar 126 but configured to be on the opposite side of the second panel 46 of the first section 16 when the securing assembly 100 is installed. The snap ring 132 can limit movement of the securing assembly 100 along the shaft axis 112 and can further add to the security of the securing assembly 100 by making it more difficult to remove the knob 102 from the front door side of the electrical cabinet 10.

In FIG. 12, the securing assembly 100 is in the free orientation. In the free orientation, the barb 130 is not engaged with the retainer 134 and the first section 16 is accordingly movable relative to the second section 18. With the knob 102 oriented as shown in FIG. 12, the set of retaining tabs 116 are oriented in the 3 o'clock and 9 o'clock positions and the pockets 118 are oriented in the 12 o'clock and 6 o'clock positions. Further, the set of pegs 128 are at terminal ends of the respective slots 44 and are oriented in the 12 o'clock and 6 o'clock positions, respectively. In this orientation, the barb 130 is configured to urge the retainer 134 (shown in FIG. 6) open to accept the barb 130 therein when joining the first and second sections 16, 18.

In FIG. 13, starting from the orientation shown in FIG. 12, the knob 102 has been rotated clockwise 90 degrees, as viewed from the perspective of the securing assembly 100 as shown in FIG. 4 (and counterclockwise from the perspective of FIG. 13), to place the securing assembly 100 in the engaged orientation. With the knob 102 oriented as shown in FIG. 13, the set of retaining tabs 116 are oriented in the 6 o'clock and 12 o'clock positions and the pockets 118 are oriented in the 3 o'clock and 9 o'clock positions. Additionally, the set of pegs 128 are at the opposite terminal ends of the respective slots 44 as compared to the free orientation shown in FIG. 12 and are now oriented in the 3 o'clock and 9 o'clock positions. In this orientation, the barb 130 is configured to engage the retainer 134 (shown in FIG. 6) and prevent the separation of the first and second sections 16, 18 of the electrical cabinet 10. It should be noted, that the set of key slots 40 are located just beyond the location of the retaining tabs 116 of the knob 102 when the securing assembly 100 is in the engagement orientation. In this location, even if the operator 24 is able to continue turning the knob 102 in the clockwise direction to align the retaining tabs 116 with the key slots 40, the barb 130 remains engaged with the retainer 134 to prevent removal of the securing assembly 100 from the electrical cabinet 10. Further, the set of slots 44 are configured to only allow rotation of the knob 102 between the free orientation (shown in FIG. 12) and the engaged orientation (shown in FIG. 13), thus preventing further rotation of the knob 102 back to the installation orientation.

FIG. 14 illustrates the front door lock 22 engaged with the knob 102 when the securing assembly 100 is in the engagement orientation. The front door lock 22 has an arm 48 movable between an unlocked position (shown in FIG. 13) and a locked position (shown in FIG. 14). As shown in FIG. 14, the arm 48 of the lock 22 is in the locked position and received within the nearest pocket of the set of pockets 118. In addition to the arm 48 preventing the front door 20 from being opened through the engagement with the pocket 118, the arm 48 also prevents rotation of the knob 102. Additionally, or alternatively, as shown in FIG. 1, the design of the front door 20 is such that the front door 20 covers the knob 102 when closed, adding an additional layer of security.

In some implementations, devices or systems disclosed herein can be utilized or installed using methods embodying aspects of the invention. Correspondingly, description herein of particular features or capabilities of a device or system is generally intended to inherently include disclosure of a method of using such features for intended purposes and of implementing such capabilities. Similarly, express discussion of any method of using a particular device or system, unless otherwise indicated or limited, is intended to inherently include disclosure, as embodiments of the invention, of the utilized features and implemented capabilities of such device or system.

For example, with reference to FIGS. 12 through 14, some embodiments can include a method by which a operator can secure a connection between the first section 16 and the second section 18 of the electrical cabinet 10. To secure the connection, with the securing assembly 100 in the free orientation (e.g., as shown in FIG. 12), the operator 24 urges the first section 16 against the second section 18 so that the barb 130 is received within the retainer 134. The operator 24 then rotates the knob 102, and thus the latch 104, from the free orientation to the engaged orientation (e.g., as shown in FIG. 13) to engage the barb 130 with the retainer 134. In some embodiments, the operator 24 can further lock the electrical cabinet 10 by closing the front door 20 thereby covering the knob 102 and turning the front door lock 22 of the front door 20 to engage the arm 48 of the lock 22 with, and be received within, the pocket 118 in the knob shaft 110 (e.g., as shown in FIG. 14).

To release the first section 16 from the second section 18, the operator 24 rotates the arm 48 of the lock 22 out of the pocket 118, opens the front door 20, rotates the knob 102, and thus the latch 104, from the engaged orientation to the free orientation, and pulls the first section 16 apart from the second section 18, removing the barb 130 from the retainer 134.

Thus, embodiments of the invention can provide improved securement of the connection between a first section and a second section of an electrical cabinet. In some embodiments, for example, a securing assembly can include a knob that can be covered by a front door and that can engage with a door lock to more securely retain the engagement of the first and second sections.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. An equipment cabinet comprising:

a door;

a first section hingedly supporting the door;

a lock on the door that is rotatable from an unlocked orientation to a locked orientation and includes an arm that, with the lock in the locked orientation, locks the door closed relative to the first section;

a second section hingedly supporting the first section; and a securing assembly that is rotatable from a free orientation to an engaged orientation to lock together the first section and the second section against hinging movement relative to each other, the securing assembly including:

a knob with a pocket, the knob coupled to and rotatable relative to the first section to rotate the securing assembly between the free orientation and the engaged orientation; and a latch coupled to the knob to be rotated by the knob as the securing assembly is rotated between the free orientation and the engaged orientation;

wherein, with the securing assembly in the free orientation, the latch is disengaged from the second section to permit the first section to hingedly open away from the second section; and wherein, with the securing assembly in the engaged orientation:

the latch is engaged with the second section to lock the first and second sections together; and the pocket of the knob receives the arm of the lock, with the lock in the locked orientation, to lock the knob against rotating the securing assembly from the engaged orientation to the free orientation.

2. The equipment cabinet of claim 1, wherein the knob includes a set of retaining tabs, the retaining tabs abut an inside surface of a first panel of the first section to prevent the knob from decoupling from the first section.

3. The equipment cabinet of claim 2, further comprising: the first section of the equipment cabinet, including a first panel that includes a hole that rotatably receives the knob, with a handle of the knob on an outer side of the first panel, relative to the cabinet, and the pocket on an inner side of the first panel, relative to the cabinet.

4. The equipment cabinet of claim 3, wherein the first panel includes a set of key slots angularly spaced around the hole so that the set of retaining tabs are not aligned for passage through the set of key slots when the securing assembly is in the free orientation or in the engaged orientation.

5. The equipment cabinet of claim 1, wherein the latch includes a barb that engages with a retainer in the second section.

6. The equipment cabinet of claim 1, wherein the latch includes a set of pegs receivable and movable within a set of slots in a second panel of the first section to limit rotation of the securing assembly to only between the free orientation and the engaged orientation.

7. An electrical cabinet comprising:

a first section;

a second section hingedly coupled to the first section;

a door hingedly coupled to the first section opposite the second section;

a securing assembly rotatable from a free orientation, in which the first and second sections can be hinged open, to an engaged orientation, in which the securing assembly releasably locks the first section closed with the second section; wherein the securing assembly includes a knob coupled to and rotatable relative to the first section; wherein the knob includes a knob handle positioned outside the first section to be covered by the door when the door is closed, and a body with a pocket that extends from the knob handle to inside the first section; and a door lock rotatable from an open orientation to a locked orientation, when the securing assembly is in the engaged orientation, to lock the door closed with the door covering the securing assembly; wherein the door lock is secured to the door and includes an arm movable to extend into the pocket of the knob inside the first section when the door lock is in the locked orientation to lock the securing assembly against rotation to the free orientation;

wherein, in the locked orientation, the door lock also locks the securing assembly against rotation from the engaged orientation to the free orientation.

8. The electrical cabinet of claim 7, wherein the knob has a set of retaining tabs and the first section has a first panel with a hole in which the knob is positioned;

wherein the hole includes a set of key slots; and wherein the set of retaining tabs are aligned to pass through the set of key slots during installation of the knob onto the first section, and are within the first section and not aligned to pass through the key slots when the knob is installed and in either of the engaged and free orientations.

9. The electrical cabinet of claim 8, wherein the set of key slots include a first key slot and a second key slot that extend outwardly from a periphery of the hole and are oppositely disposed from each other.

10. The electrical cabinet of claim 9, wherein the first and second key slots are angularly offset from a vertical reference plane extending vertically through the hole from a bottom of the electrical cabinet to a top of the electrical cabinet.

11. The electrical cabinet of claim 10, wherein the angular offset is in the range of about 5 degrees to about 10 degrees.

12. The electrical cabinet of claim 7, wherein the first section includes a set of vents, including a first vent and a second vent, spaced vertically in a side wall of the first section and the securing assembly includes a connecting rod;

the connecting rod extends along the side wall and is vertically spaced between the first vent and the second vent.

13. The electrical cabinet of claim 7, wherein the securing assembly includes a latch that extends out of the first section and releasably engages with a retainer in the second section.

14. The electrical cabinet of claim 13, wherein the latch includes a set of pegs and the first section includes a set of slots in a rear panel along which the set of pegs travel, respectively, as the securing assembly moves between the free and engaged orientations.

15. The electrical cabinet of claim 13, wherein the latch includes a barb releasably engageable with the retainer.

16. An equipment cabinet comprising:

a first section;

a second section hingedly movable relative to the first section;

a door hingedly movable relative to the first section, opposite the second section;

a door lock that is rotatable to secure the door relative to the first section; and a securing assembly to lock together the first section and the second section, the securing assembly comprising:

a knob that includes a handle arranged outside of the first section, and a body that extends from the handle to inside of the first section and is rotatable inside of the first section by the handle, from outside the first section, the body including: one or more pockets aligned inside of the first section to receive the door lock to secure the knob against rotation when the door lock secures the door relative to the first section, to lock the securing assembly in an engaged orientation; and a latch that, with the securing assembly in the engaged orientation, locks the first and second sections together, the latch being coupled to the knob so as to rotate with the knob relative to the first and second sections when installed.

17. The equipment cabinet of claim 16, wherein the latch includes a set of pegs configured to interface with a set of slots in the first section to limit the rotation of the securing assembly to about 90 degrees relative to the first section.

18. The equipment cabinet of claim 17, wherein the knob includes one or more retaining tabs that are configured to be received through key slots in the first panel, during installation of the securing assembly on the first section, to be positioned within the first section once the knob is installed.

19. The equipment cabinet of claim 18, wherein the one or more retaining tabs are angularly spaced from the one or more pockets and configured to secure the knob against removal from the first section.

* * * * *